(12) United States Patent
Sleeter

(10) Patent No.: US 6,696,581 B1
(45) Date of Patent: Feb. 24, 2004

(54) PROCESS FOR CONJUGATING CARBON-CARBON DOUBLE BONDS IN OILS

(75) Inventor: Ronald T. Sleeter, Decatur, IL (US)

(73) Assignee: Archer-Daniels-Midland Company, Decatur, IL (US)

( * ) Notice: Subject to any disclaimer, the term of this patent is extended or adjusted under 35 U.S.C. 154(b) by 0 days.

(21) Appl. No.: 10/219,518

(22) Filed: Aug. 15, 2002

(51) Int. Cl.[7] .............................................. C07C 51/347
(52) U.S. Cl. ...................................................... 554/126
(58) Field of Search ......................................... 554/126

(56) References Cited

U.S. PATENT DOCUMENTS 5,719,301 A    2/1998   Sleeter

OTHER PUBLICATIONS

Stainslaw KROMPIEC, Jerzy Suwinski, Jacek Majewski, and Janusz Grobelny; Isomerization Of Vegetable Oils Catalyzed By Dichlorotris(Triphenylphosphine)Ruthenium(II); Polish Journal of Applied chemistry; vol. XLI, z. 1–2, 35–46 (1997).

Stanislaw Krompiec, Jerzy Suwinski, Jackel Majewski, and Janusz Grobelny; Isomerization Of Vegetable Oils Catalyzed By Ruthenium Complexes; Polish Journal of Applied Chemistry; vol. XLII, z. 1, 43–48 (1998).

Paolo Pertici, Valter Ballantini, Serena Catalano, Anna Giuntoli, Corrado Malanga, and Giovanni Vitulli, (η6—Naphthalene)(η4–cycloocta–1, 5–diene)ruthenium(0) As Efficient Catalytic Precursor For The Isomerization Of Methyl Linoleate Under Mild Conditions; Journal of Molecular Catalysis A: Chemical 144, pp. 7–13 (1999).

Richard C. Larock, Xiaoyang Dong, Steven Chung, Ch. Kishan Reddy, And Laurie E. Ehlers; Preparation Of Conjugated Soybean Oil And Other Natural Oils And Fatty Acids By Hoimogeneous Transition Metals Catalysis, JAOCS, vol. 78, No. 5, 447–53, (2001).

David W. Marks and Richard C. Larock; The Conjugation And Epoxidation Of Oil, Jacobs, vol. 79, No. 1, 65–68, (2002).

*Primary Examiner*—Deborah Carr
(74) *Attorney, Agent, or Firm*—Lathrop & Gage LC

(57) ABSTRACT

A process for conjugating organic compounds containing methylene interrupted carbon-carbon double bonds comprising (a) contacting ruthenium trichloride hydrate and an organic solvent or carboxylic acid to form a first mixture, the organic solvent or carboxylic acid being present in an amount sufficient to solubilize the ruthenium trichloride hydrate, and (b) contacting the first mixture with an organic compound containing methylene interrupted carbon-carbon double bonds at a sufficient temperature and for a sufficient time to conjugate the organic compound containing methylene interrupted carbon-carbon double bonds; wherein the ruthenium in the ruthenium trichloride hydrate in (b) is present in an amount of about 5 ppm to about 100 ppm based on the weight of the organic compound containing methylene interrupted carbon-carbon double bonds.

61 Claims, No Drawings

PROCESS FOR CONJUGATING CARBON-CARBON DOUBLE BONDS IN OILS

BACKGROUND OF THE INVENTION

This invention relates to an improved process for conjugating organic compounds containing methylene interrupted carbon-carbon double bonds. This invention further relates to a process for conjugating methylene interrupted carbon-carbon double bonds found in drying and semi-drying oils.

Drying oils, which are liquid vegetable or fish oils, are triglycerides, i.e. triesters of glycerol and fatty acids, which have the ability to dry or polymerize and form a dried film. Examples of drying oils include, but are not limited to, linseed, fish, soybean, tall, tung and oiticia. Drying oils are composed of fatty acids, which have a preponderance of two or three double bonds. The drying ability of these oils is in part related to their Iodine Value ("IV"), which is a quantitative measure of the number of double bonds which they contain. Oils in the range of 195–170 IV are relatively fast-drying. Oils in the range of 140–120 IV are semi-drying, and oils with IV's under 120 are non-drying. Most of these oils have methylene interrupted double bonds. Oiticia and tung are conjugated oils and have only negligible amounts of methylene interrupted double bonds. Tall oil has a small amount of conjugated fatty acid content.

The terms "conjugated" or "conjugation" are used herein to describe compounds, e.g. triglycerides, which have carbon-carbon double bonds on adjacent carbon atoms. As used herein, "methylene interrupted" means compounds containing more than one carbon-carbon double bond wherein the double bonds are separated by a methylene group. For oils to be useful in industrial applications, including coatings, inks and the like, it is advantageous to have the carbon-carbon double bonds be conjugated, i.e. the methylene interrupt is shifted or relocated. A simplified example of the difference between methylene interrupted and conjugated is illustrated in the following examples showing only the carbon atoms:

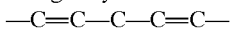

Methylene interrupted double bonds

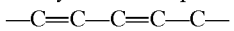

Conjugated double bonds

This conjugation facilitates polymerization and, thus, allows for faster drying. These oils can dry in 8–16 hours. Linseed oil and other oils in the range of 195 to 170 IV having substantial amount of methylene interrupted carbon-carbon double bonds are classified as drying oils, but they need to be made to polymerize rapidly to dry with the speed necessary for industrial uses such as coatings and inks. Conjugation of the methylene interrupted double bonds achieves this. When linseed oil is conjugated to about 70–75%, it will dry in about 8–16 hours, whereas natural, unconjugated linseed oil takes many days to weeks to dry.

The methylene interrupted oils are edible and are essential to life. These oils are used as cooking oils and components of foods. The conjugated oils are used for industrial purposes such as in ink formulations and coatings. Tung oil has been one oil of choice for fine woodwork coating for many years. These conjugated oils, i.e. tung and oiticia, are very expensive and their supply has been erratic. Thus, their use is limited by cost and availability. So, oils such as linseed, which are plentiful, provide a very stable reliable and economical source for industrial purposes provided they can be conjugated in a cost effective manner.

Previous research in the area over the years has resulted in many methods for conjugation. However only one method, U.S. Pat. No. 5,719,301 (Feb. 17, 1998), ("the '301 patent"), was economical enough to be put into commercial production. The product, Archer I, produced by Archer Daniels Midland Co., Decatur, Ill., has been commercially available since 1995. The '301 patent discusses prior art and numerous unsuccessful attempts to discover a commercially viable process for conjugation. Subsequent to that work, other research groups have studied methods of conjugation. None of these were successful in developing a commercially cost effective process.

Other studies on isomerization using ruthenium catalysts have been published. "Isomerization of Vegetable Oils Catalyzed by Dichlorotris(Triphenylphosphine)ruthenium", S. Krompiec, J. Suwinski, J. Majewski and J. Grobelny, Pol. J. Appl. Chem. XLI, z. 1–2, 35–46 (1997), ("Krompiec I"), disclosed the isomerization of rapeseed oil and soybean oil wherein the isomerization was conducted at a temperatures between 212° C. and 238° C., and 15–116 ppm ruthenium as the organometallic complex. In "Isomerization of Vegetable Oils Catalyzed by Ruthenium Complexes", S. Krompiec, J. Jerzy, J. Majewski and J. Grobelny), Pol. J. Appl. Chem. 42: 43–48 (1998), ("Krompiec II"), the following ruthenium catalysts were used: $RuHCl(CO)(PPh_3)_3$, $Ru(CO)_3(PPh_3)_2$, $[RuCl_2(1,5\text{-}COD)]_x$, $Ru(acac)_3$, $RuCl_2(PPh_3)_3$, $RuH_2(PPh_3)_4$, $RuCl_2(AsPh)_3$, $[RuCl_2(NBD)]_x$, and $RuCl_2(SbPh_3)_3$. Krompiec II ran isomeriztion reactions on rapeseed, soybean, linseed, and sunflower oils at 212° C. and 226° C. with two concentrations of ruthenium complexes of 58 and 116 ppm as ruthenium. Conjugation plus polymerization generally was greater than 90% for most reactions. Krompiec II disclosed that the best results were with $RuHCl(CO)(PPh_3)_3$. The reactions in Krompiec I and Krompiec II are of little commercial value because the catalyst cost is prohibitively expensive.

The paper "(n6-Naphthalene)(n4-cycloocta-1,5-diene)ruthenium(0) as Efficient Catalytic Precursor for the Isomerization of Methyl Linoleate Under Mild Conditions", P. Pertici, V. Ballantini, S. Catalano, A. Giuntioli, C. Malanga and G. Vitulli, J. Mol. Catal. A: Chem. 144:7–13 (1999) disclosed the isomerization of methyl linoleate. This reaction was run at 60° C. in hexane or methanol as solvent. The hexane needed to be dried over sodium/potassium metal alloy under argon and anhydrous methanol was obtained by drying over $CaH_2$ and distilling. Isomerization of methyl linoleate is faster in methanol than in hexane, but the percent conjugation is substantially lower in methanol than in hexane under equivalent reaction conditions. The ruthenium catalyst concentration used was 0.06 mmoles to 6.0 mmoles of methyl linoleate. Here again the catalyst fabrication cost is prohibitive and the solvent and reaction conditions are unrealistic for a viable commercial process.

The paper "Preparation of Conjugated Soybean Oil and Other Natural Oils and Fatty Acids by Homogeneous Transition Metal Catalysis", Richard Larock, et al. of Iowa State University, Journal of the American Oil Chemists Society 78, 5, 447–453 (2001). The Larock et al. paper included a few reactions with ruthenium catalyst $RuHCl(CO)(PPh_3)_3$. Most reactions studied used various homogenous organo-complexes of precious metal (rhodium and platinum) catalysts: $RhCl(PPh_3)_3$, $Rh[(C_2H_4)_2Cl]_2$, $RhCl_3 \cdot 2H_2O$, $[RhCl(C_8H_{14})_2]_2$, and $PtCl_2(PPh_3)_2$. All of these reactions with the Rh and Pt catalysts were run with a $SnCl_2 \cdot 2H2O$ promoter. In addition to the added cost of the $SnCl_2$ promoter, the cost of rhodium is generally ten times the cost of ruthenium. Platinum generally exhibits a factor of two to five times the cost of ruthenium. These costs are on a raw metal basis and do not include the additional cost of catalyst fabrication to make the organometallics. Thus the use of these Rh and Pt catalysts is practically only useful for research laboratory study. The set of experiments on isomerization of soybean oil using $RuHCl(CO)(PPH_3)_3$ as catalyst were run without the $SnCl_2$ promoter. These were run at 60° C. in the presence of a solvent, i.e. benzene or ethanol, or in the absence of a solvent. One of the Ru catalyzed reactions was run in benzene using 0.10 mole percent ruthenium and gave a conjugation of 42%. The rest of the reactions used 0.25 mole percent ruthenium or greater. The 0.10 mole percent reaction described in the Larock et al. paper is equivalent to 100 ppm ruthenium or ten times the catalyst required in the present invention (10 ppm ruthenium reaction=approximately 0.01 mol percent) to produce an equivalent 40% conjugation. In this case, even the lowest amount of ruthenium used (100 ppm) to achieve only 40% conjugation renders this approach too expensive for commercialization. The use of benzene as solvent boosted the conjugation somewhat, but again the added cost would not warrant use in a commercial operation. Significantly lower conjugation yields were obtained using ethanol as solvent or using no solvent. For example, at 1 mole percent Ru catalyst, the conjugation yield with benzene was 95% whereas the conjugation yield with ethanol was 51% and with no solvent was 40%. When a solvent was used in the Ru catalyst experiments in Larock et al., a relatively large quantity of solvent was used, i.e. 5 mL solvent per 1.5 g soybean oil. The amount of solvent required also is a disadvantage to this approach and makes it commercially unattractive.

When considering a viable commercial process, the paramount aspect is to keep the costs as low as possible. For example, a cost for product greater that a competitive oil, such as tung oil, for use in industrial applications will not succeed commercially. In addition, if the product cost is not significantly lower than that of the competing oil, it will not achieve penetration in new markets. In the case of conjugation, the catalyst cost is the most expensive aspect of the process. Therefore, the lower the catalyst cost the better the economics that can be achieved for the process. The first consideration is the cost of the metal chosen. As shown above, many metal catalysts work, including ruthenium, rhodium and platinum. However, as mentioned, the base metal price for rhodium is generally ten times the cost of ruthenium while platinum is two to five times the cost of ruthenium. As of June 2002, the cost of platinum group metals per ounce is approximately as follows: platinum cost=$550, palladium cost=$350, rhodium cost=$950, and ruthenium cost=$70. For example, rhodium catalysts would have to be about ten times as effective as ruthenium catalysts just to be competitive.

Another factor mentioned above is the catalyst fabrication cost. Generally most organoruthenium complexes start with ruthenium trichloride as the basic building block. Thus it becomes obvious that any cost to manufacture an organometallic ruthenium compound such as $RuCl(PPh_3)_3$ adds significantly to the cost and is higher than the base price of ruthenium trichloride. One commercial supplier of catalysts, Colonial Metals, Inc., P.O. Box 726, Triumph Industrial Complex, Elkton, Md. 21922-0726, is a source of these catalysts and has provided general prices which can be used as a rough guide for relative comparison. For example, as of June 2002, the cost of ruthenium metal is $70 per oz., the cost of fabricating ruthenium trichloride hydrate is $20 per 3 Kg, while the cost of fabricating any organoruthenium complex will be in excess of $60 per 3 Kg.

A third factor involved is the amount of the catalyst used. Obviously using half the catalyst would save half the metal cost and half the fabrication cost. Recovery of the catalyst is related here as well. If a catalyst can be recovered, it is thought to lower the overall cost of production. However, in the case of ruthenium, catalyst recovery does not become cost effective until the cost of the metal rises by a factor of two or so. At current catalyst pricing, if no ruthenium was recovered and, if ruthenium was lost to the product at a rate of 20 ppm ruthenium, 2 million pounds of conjugated oil would have to be produced before catalyst recovery would be warranted economically. If an organometallic catalyst is used, the added refabrication cost would also need to be included. So the goal of a commercial process is to keep the usage of ruthenium to an absolute minimum. Thus, while it may be convenient to run a reaction using 100 ppm catalyst, it would be much preferable to run it with 50 ppm as long as the product resulting from the 50 ppm reaction had nearly the same properties as the product from the 100 ppm reaction.

Temperature and reaction time are also factors for consideration. Running a reaction at increased temperature has a cost, but the catalyst cost is by far the most significant. Additionally, processing equipment such as heat exchangers/economizers can help relieve some of this cost. In the isomerization process the effective temperature window for obtaining conjugation is fairly narrow. The time of reaction is also a consideration. Larock et al. ran many reactions for 24 hours. Thus for long low temperature reactions, the requirement for reaction vessels capacity is increased. Also, based on the Larock et al. work, the large additional amount of ruthenium needed to effect conjugation at lower temperatures is not cost effective.

For ruthenium catalyzed conjugation, the cost of the catalyst makes it prohibitive to run reactions using more than about 50 ppm ruthenium as it would add too much cost to the conjugated oil product making it commercially unattractive. In fact, depending on the particular ruthenium catalyst, using over 20 ppm ruthenium is prohibitive for many applications where new markets for conjugated oil are contemplated. Use of the range from 20 to 50 ppm ruthenium would generally only be successful when competing against direct replacement of tung oil in high value added inks and coatings.

The '301 patent, which uses ruthenium trichloride as the catalyst of choice, discloses that acids, preferably formic acid, are used to solubilize the catalyst and promote the reaction. The '301 patent also discloses that low molecular weight alcohols, e.g. methanol and ethanol, can be used to solubilize the Ru catalyst but promote the conjugation reaction to a much lesser degree than acids. For example, in the conjugation of linseed oil using 20 ppm Ru as $RuCl_3$-hydrate, formic acid added throughout the reaction results in an 88% conjugation for C18-3 after 3 hours whereas ethanol added throughout the reaction results in a 21% conjugation for C18-3 after 4 hours. The '301 patent further discloses that the conjugation reaction is required to be conducted in the absence of oxygen. In view of the teachings of the '301 patent, use of an acid, specifically formic acid, is required to achieve commercially viable conjugation conversion. The '301 patent further teaches that addition of formic acid or ethanol is required to be continuous over the entire conjugation reaction. The use of formic acid results in residual formic acid, which needs to be removed for many product applications. The residual formic acid is volatile and imparts a very detrimental odor to the product even at very low concentrations. This odor is very objectionable and persists long after the oil has dried. Thus an additional processing step must be employed to remove the residual formic acid for odor sensitive applications. Therefore, for the process of the '301 patent to be commercially viable, two additional costs are incurred, i.e. the expense of using formic acid and the expense of removing it. Additionally, the use of formic acid presents a hazard. It is an inhalation hazard and is very difficult to use in the production process and, therefore, requires additional safety equipment, ventilation and facilities. It would be highly desirable to develop a conjugation process which avoids the use of acid but achieves commercially viable conjugation conversion. It has now been discovered that solvents or combinations of solvents which dissolve ruthenium catalyst prior to contacting with the organic compound containing methylene interrupted carbon-carbon double bonds, e.g. triglyceride oil, and subsequently dissolves in the organic compound substrate produces commercially viable conjugation conversion without the need for use of an acid or other reaction augmentation material, i.e. promoter, added during the conjugation reaction to promote the conjugation reaction.

SUMMARY OF THE INVENTION

According to the invention, a process for conjugating organic compounds containing methylene interrupted carbon-carbon double bonds is provided comprising (a) contacting ruthenium trichloride hydrate and an organic solvent to form a first mixture, the organic solvent being present in an amount sufficient to solubilize the ruthenium trichloride hydrate, and (b) contacting the first mixture with an organic compound containing methylene interrupted carbon-carbon double bonds at a sufficient temperature and for a sufficient time to conjugate the organic compound containing methylene interrupted carbon-carbon double bonds; wherein the ruthenium in the ruthenium trichloride hydrate in (b) is present in an amount of about 5 ppm to about 100 ppm based on the weight of the organic compound containing methylene interrupted carbon-carbon double bonds, wherein the first mixture substantially dissolves in the organic compound containing methylene interrupted carbon-carbon double bonds.

In one embodiment, the conjugation of step (b) is optionally conducted in the presence of hydrogen.

Further according to the invention, a process for conjugating organic compounds containing methylene interrupted carbon-carbon double bonds is provided comprising (a) contacting ruthenium trichloride hydrate and at least one carboxylic acid having at least 2 carbon atoms to form a first mixture, said carboxylic acid being present in an amount sufficient to solubilize said ruthenium trichloride hydrate, and (b) contacting the first mixture with an organic compound containing methylene interrupted carbon-carbon double bonds at a sufficient temperature and for a sufficient time to conjugate the organic compound containing methylene interrupted carbon-carbon double bonds; wherein the ruthenium in said ruthenium trichloride hydrate in (b) is present in an amount of about 5 ppm to about 100 ppm based on the weight of said organic compound containing methylene interrupted carbon-carbon double bonds, and wherein the first mixture substantially dissolves in the organic compound containing methylene interrupted carbon-carbon double bonds.

In one embodiment, the conjugation of step (b) is optionally conducted in the presence of hydrogen.

BRIEF DESCRIPTION OF THE DRAWINGS

Not Applicable.

DETAILED DESCRIPTION OF THE INVENTION

A first embodiment of the invention relates to a process for conjugating organic compounds containing methylene interrupted carbon-carbon double bonds comprising (a) contacting ruthenium trichloride hydrate and a suitable organic solvent to form a first mixture, the organic solvent being present in an amount sufficient to solubilize the ruthenium trichloride hydrate, and (b) contacting the first mixture with an organic compound containing methylene interrupted carbon-carbon double bonds at a sufficient temperature and for a sufficient time to conjugate the organic compound containing methylene interrupted carbon-carbon double bonds; wherein the ruthenium in said ruthenium trichloride hydrate in (b) is present in an amount of about 5 ppm to about 100 ppm based on the weight of the organic compound containing methylene interrupted carbon-carbon double bonds, wherein the first mixture is substantially soluble in the organic compound containing methylene interrupted carbon-carbon double bonds.

A second embodiment of the invention relates to a process for conjugating organic compounds containing methylene interrupted carbon-carbon double bonds comprising (a) contacting ruthenium trichloride hydrate and at least one carboxylic acid having at least 2, preferably 2 to about 6, carbon atoms to form a first mixture, said carboxylic acid being present in an amount sufficient to solubilize said ruthenium trichloride hydrate, and (b) contacting the first mixture with an organic compound containing methylene interrupted carbon-carbon double bonds at a sufficient temperature and for a sufficient time to conjugate the organic compound containing methylene interrupted carbon-carbon double bonds; wherein the ruthenium in said ruthenium trichloride hydrate in (b) is present in an amount of about 5 ppm to about 100 ppm based on the weight of the organic compound containing methylene interrupted carbon-carbon double bonds, and wherein the first mixture is substantially soluble in the organic compound containing methylene interrupted carbon-carbon double bonds.

Organic compounds containing methylene interrupted carbon-carbon double bonds that can be employed according to the invention include, but are not limited to, triglyceride oils, mono- or diglycerides and polyol fatty acid esters of a vegetable or fish oil, esters of a vegetable or fish oil, fatty acids, mixtures thereof, and the like. For purposes of the description of the process of the invention, use of the term "oil" is meant to be equivalent to the organic compounds containing methylene interrupted carbon-carbon double bonds.

The preferred triglyceride oils are drying or semi-drying oils having an Iodine Value (IV) of at least 120, preferably an IV of 120 to 195. Examples of suitable methylene interrupted triglyceride oils include, but are not limited to, linseed oil, fish oil, soybean oil, sunflower oil, safflower oil, rapeseed oil, corn oil, tall oil, genetically modified vegetable oils, or mixtures thereof. The currently preferred triglyceride oils for use in the process of the invention are linseed oil and soybean oil.

Examples of suitable mono- or diglycerides and polyol fatty acid esters of a vegetable or fish oil include, but are not limited to, monoglycerides or diglycerides of liquid vegetable oils such as soybean, corn, canola, and sunflower, compounds frequently used as emulsifiers such as sorbitan monoglycerides, and the like. The currently preferred mono- or diglycerides and polyol fatty acid esters of a vegetable or fish oil are monoglycerides of liquid vegetable oils such as soybean, corn, canola, and sunflower.

For solubilization of the ruthenium trichloride hydrate catalyst in the organic compound containing methylene interrupted carbon-carbon double bonds, the ruthenium trichloride hydrate is solubilized in an organic solvent or a carboxylic acid, preferably an organic solvent. The organic solvent or carboxylic acid utilized in the conjugation reaction of the process of the invention is added such that all organic solvent or carboxylic acid present in step (b) is added in the formation of the first mixture. As such, contrary to the teaching of the '301 patent, excellent conjugation results are achieved without the need for addition of carboxylic acid, e.g. formic acid, throughout the course of the conjugation reaction.

As used herein, suitable organic solvents are any liquid organic solvent having the following properties: (i) the organic solvent will dissolve the ruthenium trichloride hydrate catalyst, i.e. the organic solvent will solubilize the ruthenium trichloride hydrate catalyst, and (ii) the organic solvent and ruthenium catalyst mixture will subsequently be substantially dissolved in the organic compound containing methylene interrupted carbon-carbon double bonds. As used herein, the organic solvent and ruthenium trichloride hydrate catalyst mixture is substantially dissolved in the organic compound containing methylene interrupted carbon-carbon double bonds when an amount of the organic solvent/ruthenium catalyst mixture to achieve a sufficient percent conjugation of the organic compound containing methylene interrupted carbon-carbon double bonds is dissolved in the organic compound containing methylene interrupted carbon-carbon double bonds. Such suitable organic solvents can be readily determined by one of ordinary skill in the art without undue experimentation. For example, suitable organic solvents include, but are not limited to, alcohols (such as monoalcohols, diols, and polyols), monoglycerides, mono-diglycerides, ketones, esters, ketoesters, alkyl lactates, ethers such as ethylene glycol monoalkyl ethers, emulsifiers (such as long chain alcohols, emulsfers sold by ICI Performance Specialties under the trademarks Span™ (sorbitan esters) and Tween™ (ethoxylated sorbitan esters), and other esters of fatty acids), or mixtures thereof, provided such solvents will solubilize the ruthenium trichloride hydrate catalyst, and that the solvent and ruthenium catalyst mixture will subsequently be substantially dissolved in the organic compound containing methylene interrupted carbon-carbon double bonds.

All organic solvents or carboxylic acids used to solubilize the ruthenium trichloride hydrate catalyst are preferably substantially free of water. As used herein, the phrase "substantially free of water" means that the alcohol or carboxylic acid contains no more than 5 wt. %, preferably no more than 1 wt. %, water. While not wishing to be bound by theory, it is believed that increasing the amount of water present increases the likelihood that increasing amounts of ruthenium trichloride will not be thoroughly solubilized or dispersed in the oil. Thus, as the alcohol or carboxylic acid is removed by volatilization as the substrate is heated to reaction temperature and the concentration of water remaining is increased, the water becomes less soluble or dispersed in the oil. Therefore, it is anticipated that the ruthenium chloride will become increasingly concentrated in the water and eventually form clumps of non-dispersed, non-solubilized particulate catalyst as the water evaporates. The amount of water that can be present in the organic solvent or carboxylic acid will be dependent on the specific organic solvent or carboxylic acid used, and will readily be determined by one of ordinary skill in the art without undue experimentation. For example, with ethanol as the organic solvent, an ethanol/water mixture can be used provided the water level does not exceed the amount of water present in the ethanol/water azeotrope, i.e. the water content can be up to about 5 wt. %.

Alcohols that can be employed according to the invention are selected from monoalcohols having 1 to about 18, preferably 1 to about 8, carbon atoms, diols having 2 to about 5, preferably 3 to 4, carbon atoms, polyols having 3 to about 6 carbon atoms, monoglycerides, or mixtures thereof. The alcohols that can be employed according to the invention are either those that are volatile under the conditions of the conjugation reaction, e.g. alcohols having a boiling point below the reaction temperature, or those that are less volatile under the conditions of the conjugation reaction. The alcohols for use in the invention preferably are absolute alcohols, i.e. dehydrated alcohols.

Examples of suitable monoalcohols include, but are not limited to, methanol, ethanol, isopropanol, butanol, 1-octanol, 2-methyl-1-butanol, cyclohexanol, decyl alcohol, oleyl alcohol, and mixtures thereof. The currently preferred monoalcohols are methanol and ethanol, with ethanol being more preferred. The currently most preferred monoalcohol is absolute ethanol due to results achieved therewith.

The diol and polyol alcohols are generally not soluble in a triglyceride oil at temperatures under 120° C. Those diols with the -OH groups on one end of the molecule such as 1,2-butanediol however do have limited solubility in linseed oil at room temperature. Solubility of the 1,2-diols and others in vegetable oil would be expected to be enhanced with increasing carbon chain length. 1,2-propanediol is very soluble in oil at the reaction temperature of about 180° C. Thus, employing less volatile alcohols such as 1,2-propanediol (1,2-propylene glycol) as the catalyst solvent permits the catalyst to be added at the conjugation reaction temperature. Ruthenium trichloride hydrate is very soluble in the diols and polyols including, but not limited to, ethylene glycol, 1,2-propanediol, 1,5-pentanediol, glycerol and the like. Thus, for those substrates in which these diols are soluble, the diols and mixtures thereof as a class would work very well. The currently preferred diols are 1,2-propanediol and 1,2-butanediol. The currently preferred polyols are glycerol and the like.

Monoglycerides and mono-diglyceride mixtures that can be employed according to the invention are glycerol esters of fatty acids in which one or two acid groups are attached to the glycerol group. The monoglycerides are represented by the formula $RCOOCH_2CHOHCH_2OH$ wherein R is an alkyl, or alkenyl group having up to about 21 to 24 carbon atoms. In the case of mono-diglycerides, i.e. mixtures of monoglycerides and diglycerides, the diglycerides are corresponding to the monoglycerides of the above formula wherein one of the —OH groups is a second —OOCR group and wherein the two R groups are the same or different. Examples of suitable monoglycerides, mono-diglycerides and fatty acid ester-based emulsifiers include, but are not limited to, glycerol monooleate, a mid-oleic acid sunflower oil-based distilled monoglyceride which is sold commercially as DMG 130 (Archer Daniels Midland Co., Decatur, Ill.), lactylated mono-diglycerides and mono-diglycerides, and mixtures thereof. Fatty acid ester-based emulsifiers can also be employed according to the invention. Examples of these emulsifiers include lactylated monoglycerides, sorbitan monoglycerides, and mixtures thereof.

Ketones that can be employed according to the invention are ketones having 3 to about 8 carbon atoms, preferably 3 to about 7 carbon atoms. Examples of suitable ketones include, but are not limited to, methyl ethyl ketone, acetone, 3-methyl-2-butanone, 4-methyl-2-pentanone, 2-pentanone, 2-octanone, 2-methylcyclohexanone and mixtures thereof.

Alkyl lactates that can be employed according to the invention are represented by the formula $CH_3CHOHCOOR_1$ wherein $R_1$ is an alkyl group having 1 to about 4 carbon atoms. Examples of suitable alkyl lactates include, but are not limited to, methyl lactate, ethyl lactate, butyl lactate, and mixtures thereof. The currently preferred alkyl lactate is ethyl lactate.

Ethylene glycol monoalkyl ethers that can be employed according to the invention are represented by the formula $H(O—CH_2CH_2)_x—OR_2$ wherein $R_2$ is an alkyl group having 1 to about 4 carbon atoms and x is 1 to about 10, preferably 1 to 8, and more preferably 1. Examples of suitable ethylene glycol monoalkyl ethers include, but are not limited to, ethylene glycol monomethyl ether, ethylene glycol monoethyl ether, ethylene glycol monobutyl ether, polyethylene glycol monomethyl ether, polyethylene glycol monobutyl ether, and mixtures thereof. The currently preferred ethylene glycol monoalkyl ether is ethylene glycol monoethyl ether.

Esters that can be employed according to the invention are esters having 4 to about 8 carbon atoms, preferably 4 to about 6 carbon atoms. Examples of suitable esters include, but are not limited to, ethyl acetate, butyl acetate, butyl formate, propyl acetate, methyl salicylate, methyl valerate, diethyl malonate, and mixtures thereof.

Ketoesters that can be employed according to the invention are ketoesters having 6 to about 10 carbon atoms, preferably 6 to about 8 carbon atoms. Examples of suitable ketoesters include, but are not limited to, methylacetoacetate, ethylacetoacetate, ethyl levulinate, and mixtures thereof.

Aldehydes that can be employed according to the invention are aldehydes having 2 to about 6 carbon atoms, preferably 3 to about 6 carbon atoms. Examples of suitable aldehydes include, but are not limited to, acetaldehyde, propionaldehyde, butyraldehyde, hexanal, and mixtures thereof.

The currently preferred organic solvents are alcohols and monoglycerides. Monoalcohols and diols are the preferred alcohols, with monoalcohols being most preferred.

Carboxylic acids that can be employed according to the invention are carboxylic acids having 2 to about 6, preferably 2 to about 3, carbon atoms. Examples of suitable carboxylic acids include, but are not limited to, acetic acid, propionic acid, and mixtures thereof. The currently preferred carboxylic acid is acetic acid due to results achieved therewith.

The amount of organic solvent or carboxylic acid utilized in the process of the invention is that amount required to solubilize the ruthenium trichloride hydrate catalyst into the conjugation reaction mixture and is readily determined by one of ordinary skill in the art without undue experimentation. The amount of organic solvent or carboxylic acid used to solubilize the ruthenium trichloride hydrate will vary and depend to a large extent on such factors as the reaction vessel size, degree of stirring, and heat transfer capability.

The conjugation reaction can be operated as a batch or continuous process. In one preferred embodiment when the process is operated in batch configuration, it would be desirable to preheat the major portion of oil to be conjugated to the conjugation reaction temperature and contact a minor portion of cooler oil at a temperature below the conjugation reaction temperature (e.g. around 100° C.) with the first mixture to form a second mixture. Thus the second mixture, i.e. a low temperature oil/catalyst concentrate, would be contacted with the remaining portion of oil preheated to the conjugation reaction temperature, e.g. 180° C., to facilitate reaction.

It is most convenient to add the solution of catalyst in organic solvent or carboxylic acid just around or above the boiling point of the organic solvent or carboxylic acid for those solvents that boil below the optimal temperature of the conjugation reaction (e.g. 175–185° C.). Using ethanol, for example, this temperature is preferably 95–110° C. This prevents the spontaneous flashing off of the ethanol at higher temperatures and allows the ethanolic solution of ruthenium trichloride to be solubilized and dispersed into the oil.

The above procedures would generally be regarded as a batch process. However, the process of the invention can also be operated as a continuous process. Volatile alcohols or carboxylic acids may be utilized in a continuous process. For example, by adding an ethanolic catalyst to the oil in a rapid mixing low volume vessel or line at 95–110° C. (fitted to allow for ethanol to be flashed off and recovered) the oil could proceed through rapid heat exchangers or be mixed with heated oil to achieve the most preferred reaction temperature of 175–185° C. and flow through a vessel or line with the required residence time. Following conjugation the oil could then be directed back through an economizer heat exchanger to preheat incoming oil.

In another continuous reaction embodiment, an organic solvent having a boiling point at or above the conjugation reaction temperature, e.g. 1,2-propylene glycol or monoglyceride, would be utilized. The solution of organic solvent and ruthenium trichloride hydrate would be added with mixing to the oil at the conjugation reaction temperature on a continuous basis, such as with a metering pump. The conjugation reaction mixture could then flow through a continuous reaction vessel for a reaction residence time sufficient to achieve the desired percent conjugation, and then be cooled through an economizer used to preheat the incoming oil for conjugation.

The amount of ruthenium trichloride hydrate utilized in the process of the invention is that amount necessary to achieve a sufficient percent conjugation of the organic compound containing methylene interrupted carbon-carbon double bonds, and will be based on the amount of ruthenium in the ruthenium trichloride hydrate catalyst present in the conjugation reaction mixture. Typically, the amount of ruthenium in the ruthenium trichloride hydrate present in the first mixture contacted with the organic compound containing methylene interrupted carbon-carbon double bonds is about 5 ppm to about 100 ppm, preferably about 5 ppm to about 50 ppm, more preferably 10 ppm to about 50 ppm, and most preferably about 15 ppm to about 40 ppm, based on the weight of the organic compound containing methylene interrupted carbon-carbon double bonds present in the conjugation reaction mixture.

The temperature for formation of the first mixture will vary depending on the specific organic solvent or carboxylic acid utilized to solubilize the ruthenium trichloride hydrate, and will typically be below the boiling point of the organic solvent or carboxylic acid being used. The conjugation reaction of the invention can be conducted at a conjugation reaction temperature of about 150° C. to about 200° C., preferably about 160° C. to about 200° C., more preferably about 170° C. to about 190° C., and most preferably about 175° C. to about 185° C. The conjugation reaction time will be the time sufficient to obtain the desired percent conjugation of the organic compound containing methylene interrupted carbon-carbon double bonds and will depend on a variety of factors such as reaction temperature, type of reactor used, catalyst use level, organic solvent or carboxylic acid used, and the particular organic compound containing methylene interrupted carbon-carbon double bonds. The sufficient reaction time can be readily determined by one of ordinary skill in the art without undue experimentation. For example, in a batch reactor configuration the reaction can be run preferably between about 1 to about 4 hours, more preferably between about 3 to about 4 hours. However, if additional viscosity is needed to match more closely the viscosity of tung oil, additional reaction time may be employed to increase viscosity by allowing for increasing polymerization to occur at the temperature of reaction. This added reaction time also produces a faster drying oil. The polymerization may be controlled to insure the product meets viscosity requirements.

The conjugation reaction can be conducted in the presence of oxygen or under an inert atmosphere including, but not limited to, nitrogen, carbon dioxide, or argon. Contrary to the teaching of the '301 patent, the process of the invention does not require the reaction to be conducted in the absence of oxygen.

The required percent conjugation will vary depending on the specific application intended for the conjugated oil. Preferably the organic compound containing methylene interrupted carbon-carbon double bonds is conjugated to a level to achieve at least about 30%, more preferably at least about 50%, arid most preferably at least about 70%, conjugation of the methylene interrupted carbon-carbon double bonds in the organic compound. Higher percent conjugation can generally be achieved by increasing the reaction temperature, reaction time or catalyst use level. Typically, 70% conjugation is sufficient for many high value industrial applications. For even higher value added industrial applications, such as use of replacement of tung oil in ink formulations where very fast drying is needed, a higher percent conjugation may be needed. Operating the process of the invention with 40 ppm ruthenium to conjugate linseed oil will produce an oil superior to tung oil in drying time. Under current market pricing, linseed oil (currently selling in the low 20 cent per pound range) can be economically conjugated to be commercially competitive with tung oil (currently selling in the range of $0.80 to $1.10 per pound).

In an optional embodiment, the conjugation reaction of the instant invention is conducted in the presence of hydrogen, preferably added as hydrogen gas. The amount of hydrogen gas to be used will be based on the reaction parameters, e.g. reactor size, reactor type, scale of the reaction, etc., and can readily be determined by one of ordinary skill in the art without undue experimentation based on the teachings herein.

In another optional embodiment, after the desired conjugation yield has been achieved in the conjugation reaction, the reaction mixture is maintained at a suitable temperature for an additional time period in order to achieve additional polymerization and bodying of the oil.

A third embodiment of the invention relates to conjugated organic compounds prepared by conjugating organic compounds containing methylene interrupted carbon-carbon double bonds according to the process(es) of the invention.

In the following examples, an approximation of the conjugation was used to monitor the progress of the reaction. For convenience, the reaction was followed by monitoring the loss of linolenic acid and/or linoleic acid depending on the oil being conjugated. The base linseed oil used had a linolenic acid content of 53.8%. This was used to compute the degree of conjugation. For example, a product of reaction having a final linolenic acid content of 20% would have had 33.8% (53.8%−20%=33.8%) divided by 53.8% of the linolenic acid conjugated or 62.8% conjugation. It is accepted that this calculation is only an approximation of the percent conjugation because not all of the generated compounds are conjugated. For example, dimerization and polymerization can occur and these compounds are counted as being conjugated oil under this calculation. Nevertheless, this calculation is adequate and extremely useful for the purposes of general comparison and rating the relative effectiveness of the conjugation reactions.

EXAMPLES

Examples 1–13

All conjugation reactions were run using ruthenium catalysts with 250 grams of superb linseed oil (Archer Daniels Midland, 126 Lagrange Rd., Red Wing, Minn. 55066) in a 500 mL round bottom flask in a batch type reaction with stirring using a magnetic stirrer. The flask was fitted with a heating mantle and a collar of fiberglass insulation to maintain uniform heating with minimal temperature variation. A thermometer was immersed in the oil to monitor temperature. All ruthenium catalysts were obtained from Colonial Metals, Inc., Triumph Industrial Complex, Elkton, Md. 21922-0726 and all ruthenium assays were provided with a certificate of analysis for each catalyst. The method of analysis used for all ruthenium compounds was gravimetric following reduction to ruthenium metal. All catalysts were added at 95–105° C. unless otherwise noted. Absolute ethanol was used for all additions of ruthenium trichloride hydrate except where noted. All reactions were run for four hours unless otherwise noted and samples were pulled hourly. The percent conjugation was determined as set forth herein based on the linolenic acid content. Analysis of the reaction products and starting oils was done by high resolution capillary column gas chromatography using a Hewlett Packard 5890 Series II gas chromatograph equipped with a flame ionization detector with Chem Station software using a Chrompak CPSil 88 column, 50 meter long by 0.25 mm ID with a 0.2$\mu$m coating. All reactions used a temperature of 178–184° C. unless otherwise noted. All reactions used a catalyst concentration of 20 ppm ruthenium unless otherwise noted. A survey of the effectiveness of various fabricated organometallic ruthenium complex catalysts, ruthenium tribromide, and ruthenium oxide was performed for comparison to ruthenium trichloride. In these reactions, the only change was in the method of addition of the catalyst. Often these catalysts were not soluble in petroleum ether (Fisher Scientific E139-1), ethanol (Fisher Scientific A405-4, anhydrous denatured) or water and were slurried into the reaction mixture with ethanol or petroleum ether. The method of catalyst addition are noted for each ruthenium catalyst.

| Catalyst Used | Catalyst Formula | Reaction Number | % Ru by Assay |
|---|---|---|---|
| Tris(2,2,6,6)tetramethyl-3,5-heptane dianotoruthenium (III) | Ru(C$_{11}$H$_{19}$O$_2$)$_3$ | 1 | 15.53% |
| Cis-dichlorobis(2,2bipyridine) Ruthenium(II) dihydrate | RuCl$_2$(C$_{10}$H$_8$N$_2$)$_2$.2H$_2$O | 2 | 19.3% |
| Ruthenium(III)bromide hydrate | RuBr$_3$.H$_2$O | 3 | 25.5% |

| Catalyst Used | Catalyst Formula | Reaction Number | % Ru by Assay |
|---|---|---|---|
| Hexamine ruthenium chloride | [Ru(NH$_3$)$_6$]Cl$_3$ | 4 | 32.6% |
| Ruthenium(III)2,4-pentanedionate | Ru(C$_5$H$_7$O$_2$)$_3$ | 5 | 25.3% |
| Tri-ruthenium(0)dodecacarbonyl | Ru$_3$(CO)$_{12}$ | 6 | 47.4% |
| Ruthenium(III) nitrosayl chloride monohydrate | Ru(NO)Cl$_3$.H$_2$O | 7 | 39.53% |
| Dichloro tris(triphenylphosphene ruthenium(II) | RuC$_{12}$[P(C$_6$H$_5$O$_3$] | 8 | 10.54% |
| Potassium m-oxo-bis(pentachloro)ruthenate(IV) hydrate | K$_4$[(RuCl$_5$)$_2$O].xH$_2$O | 9 | 27.7% |
| Ruthenium (II, III)mu-oxoacetate trihydrate | [Ru$_3$O(O$_2$CH$_3$)$_6$(H$_2$O)$_3$]—CH$_3$CO$_2$ | 10 | 38.56% |
| Dichloro(1,5-cyclo-octadiene)ruthenium(II)oligomer | RuCl$_2$(1,5-C$_8$H$_{12}$) | 11 | 35.9% |
| Ruthenium(IV)oxide hydrate | RuO$_4$.H$_2$O | 12 | 55.9% |
| Ruthenium trichloride hydrate | RuCl$_3$.xH$_2$O | 13 | 40.1% |

| Reaction Number | Solubility[1] | |
|---|---|---|
| | In Solvent | In Substrate |
| 1 | VS - Pet ether | S |
| 2 | SS - Abs. EtOH | IS - black ppt. @ end of reaction |
| 3 | IS - Added as slurry in ethanol with about 5% water | S |
| 4 | IS - Added as slurry in Abs. EtOH | S |
| 5 | SS - Abs. EtOH | S |
| 6 | IS - EtOH, Pet ether, Water Added as slurry in Abs. EtOH | S |
| 7 | S - Abs. EtOH | S |
| 8 | IS - EtOH, Pet ether, Water Added as slurry in Abs. EtOH | S |
| 9 | IS - Added as EtOH slurry | IS - black ppt. @ end of reaction |
| 10 | SS - EtOH/Water Added as EtOH slurry | IS - brown ppt. @ end of reaction |
| 11 | IS - Added as EtOH slurry | IS - black ppt. @ end of reaction |
| 12 | IS - Added as EtOH slurry | IS - black ppt. @ end of reaction |
| 13 | S - Abs. EtOH | S |

[1]VS = very soluble; SS = slightly soluble; IS = insoluble; S = soluble

| Reaction Number | % Conjugation (after 4 hr reaction time) |
|---|---|
| 1 | 7.8 |
| 2 | 2.4 |
| 3 | 2.5 |
| 4 | 1.7 |
| 5 | 22.4 |
| 6 | 32.3 |
| 7 | 58.8 |
| 8 | 74.5 |
| 9 | 2.6 |
| 10 | 5.6 |
| 11 | 5.3 |
| 12 | 16.1 |
| 13 | 73.8 |

Thus without formic acid to aid in promoting solution and reaction, many of the organoruthenium complexes are ineffective, as is ruthenium oxide. However, without formic acid as a solubilization aid and reaction promoter, ruthenium trichloride hydrate (catalyst 13) is as good as the best organoruthenium complex tested, that being catalyst (8), RuC$_{12}$[P(C$_6$H$_5$O)$_3$]. Ruthenium bromide hydrate run in the example above was ineffective. It is believed that had absolute ethanol been used with the ruthenium bromide hydrate, the reaction likely would have been improved. However, due to the limited solubility of ruthenium bromide, large quantities of ethanol would have been required to solubilize the catalyst.

Example 14

A comparative experiment was run with ruthenium trichloride hydrate versus ruthenium trichloride hydrate with formic acid as a solubilization aid and promoter. The reactions were run as set forth in Example 13 except that, for the formic acid promoted reaction, formic acid (Aldrich Chemical Co. 10,652-6) was added at the beginning of the reaction and dropwise during the reaction. 0.2 mL formic acid was added at the start of reaction after the addition of the ruthenium trichloride catalyst added as a solution in absolute ethanol. Formic acid was added dropwise during the reaction and a total of 3.2 mL was added including the 0.2 mL at the beginning. 71.1% conjugation was achieved for the formic acid promoted reaction after four hours of reaction (average conjugation yield of two reactions). This compares to the 73.1% conjugation achieved with the unpromoted reaction of the instant invention. These results demonstrate that the conjugation reaction conducted according to the process of the invention achieves acceptable % conjugation without the disadvantages of using formic acid to promote the conjugation reaction.

Example 15

A set of experiments were conducted using ruthenium trichloride hydrate at different temperatures to determine the optimum conditions of reaction. The reactions were run as set forth in Example 13 with the only change being the temperature of reaction, i.e. 20 ppm solubilized with absolute ethanol in 250 g of superb linseed oil.

| Reaction Temperature ° C. | % Conjugation (after 4 hours reaction time) |
|---|---|
| 160 | 50.0 |
| 180 | 73.8 |
| 200 | 77.3 |

Example 16

A series of experiments were conducted using different catalyst levels of ruthenium trichloride hydrate to determine the optimum conditions of reaction. The reactions were run as set forth in Example 13 with the only change being the catalyst level, i.e. 180° C. reaction temperature with Ru catalyst solubilized with absolute ethanol in 250 g superb linseed oil.

| ppm Ruthenium | % Conjugation | |
| --- | --- | --- |
| | 1 hr reaction time | 4 hr reaction time |
| 5 ppm | 12.5 | 12.3 |
| 10 ppm | 33.2 | 39.7 |
| 20 ppm | 57.4 | 73.8 |
| 40 ppm | 76.9 | 90.0 |

These results demonstrate that less than 50 ppm ruthenium is needed to achieve high levels of conjugation for most applications. The results further demonstrate that catalyst use levels as low as 5 ppm ruthenium achieve sufficient conjugation for selected applications.

Example 17

A reaction, conducted to illustrate the effectiveness of the reaction on other oils, was run on soybean oil (Lady Lee brand 100% liquid soybean oil distributed by Milan Distributing Co., Milan, Ill. 61262 (Eagle Foods)). This reaction was run using 20 ppm ruthenium as ruthenium trichloride hydrate. The only difference was the substitution of 250 grams of soybean oil for the 250 grams of linseed oil. The conjugation was computed slightly differently and the linoleic acid conjugation was calculated as well. After four hours of reaction, the % conjugation was 79.3% for linolenic acid and 56.5% for linoleic acid. The linoleic acid content was determined in a manner similar to that used for linolenic acid.

Example 18

A reaction was run to illustrate the use of another volatile monoalcohol as the alcohol solvent. In this case, the reaction was run exactly as set forth in Example 13 except that absolute methanol (Fisher Scientific A453-500 purge and trap grade) was substituted for absolute ethanol, and the ruthenium chloride hydrate/methanol catalyst solution was added at about 68° C. The percent conjugation achieved after four hours of reaction was 75.5%. This is comparable to the percent conjugation achieved with absolute ethanol, i.e. 73.8%.

Example 19

A comparative reaction was run on the use of a high concentration of water in ethanol to demonstrate the failure of the reaction to achieve desired conjugation when excess water, i.e. more than that capable of distilling off as the ethanol/water azeotrope, is used. For this reaction, a 50/50 v/v blend of water/absolute ethanol was used and the reaction was run exactly as set forth in Example 13. The conjugation achieved after 4 hours of reaction was only 5.4%. This demonstrates the sensitivity to water in the alcohol and confirms that, if the water content is more than the capacity of the alcohol to be removed as the azeotrope, the yield of conjugation will suffer significantly.

Example 20

A reaction was run to illustrate the use of a diol, i.e. 1,2-propanediol, as the alcohol solvent. 12.0 mg of ruthenium chloride hydrate was dissolved in ca. 2 mL of 1,2-propanediol (B.P. 186–188° C., Aldrich Chemical Co. 39,803-9) and added dropwise to 250 grams of superb linseed oil (20 ppm ruthenium basis) at 176–181° C. The reaction was allowed to proceed with stirring at 180° C. +/−2° C. for 4 hours. The conjugation achieved was 68.9%.

The advantage of the use of this solvent is to enable the addition of the catalyst at the reaction temperature without the undesirable, vigorous flashing off observed with lower boiling solvents. While this reaction was run as a batch process, this procedure will allow for use of a continuous process by permitting the alcohol catalyst solution to be added at the temperature of reaction on a continuous basis.

Example 21

A reaction was run to illustrate the use of a monoglyceride as the alcohol solvent. The reaction using melted liquid monoglyceride (ca. 3 mL) (DMG 130—a mid oleic acid sunflower oil-based distilled monoglyeride; Archer Daniels Midland Co., Decatur, Ill.) with a small amount of 1,2-propylene glycol (0.3 mL) and absolute ethanol (0.5 mL) as the solvent was run identically as set forth in Example 13 except that liquid monoglyceride was used to solubilize the ruthenium catalyst and then to dissolve the catalyst in the oil. The conjugation achieved was 78.1%. While this reaction was run as a batch process, this procedure will allow for use as a continuous process.

Example 22

A reaction was run to demonstrate the use of organic acids to solubilize ruthenium chloride hydrate in the reaction mixture. This reaction was run as set forth in Example 13 except that acetic acid (Aldrich Chemical Co. 24,285-3) was used to solubilize the ruthenium chloride hydrate catalyst. The acetic acid/catalyst solution was added to the linseed oil (20 ppm ruthenium basis) between 120–122° C. (BP of acetic acid=118° C.). The acetic acid/catalyst solution solubilized nicely in the oil then vaporized slowly as the temperature was increased to the reaction temperature of 180° C. The conjugation achieved after four hours of reaction was 40.7%.

When compared to Example 23 in which formic acid was used, acetic acid demonstrated superior solvent properties and produced a significantly higher conjugation yield. When additionally compared to Example 13, this experiment also demonstrates that the process of this invention is superior to the teaching of the '301 patent in that continual addition of organic acids to promote conjugation is not required.

Example 23

A comparative experiment using formic acid in place of acetic acid was conducted according to the procedure set forth in Example 22, except that the formic acid/catalyst solution was added at 98–113° C. The formic acid/catalyst solution did not solubilize well in the oil and residual catalyst was deposited on the wall of the reaction flask. The conjugation achieved after four hours of reaction was 10.3%.

This experiment demonstrates that acceptable conjugation yield is not obtained using formic acid when the formic acid is not added continually throughout the conjugation reaction as is taught in the '301 patent.

Example 24

An experiment according to the procedure set forth in Examples 1–13 was run using hydrogen gas assisted promotion of the reaction. 20 ppm ruthenium as ruthenium trichloride hydrate as a solution in about 2 mL of absolute ethanol was added to 250 g of superb linseed oil and the reaction was run at 180° C. Hydrogen was bubbled into the reaction mixture at a rate of 0.2–1.0 mL/min through a 12 mm course gas dispersion tube (Fisher Scientific 11138B) fitted with a Gilmont Correlated Variable Area Flowmeter (micro range 0.02–15 mL/min air) (Cole Parmer catalog number U-03210-00) using a Swagelock B-2MG (St. Louis Valve and Fitting Co.) metering valve to control gas flow. The conjugation yield achieved was 67.7%.

This reaction was unique as most metal catalysts under reductive conditions will reduce the double bonds. Nickel will reduce double bonds under these conditions. Palladium is a catalyst of choice when the reduction of the double bonds of free fatty acids to produce saturated fatty acids is done. Ruthenium is also used as a reducing catalyst in many applications.

In the reaction of this experiment, the stearic acid content was 4.0% for the starting unreacted linseed oil and 4.5% after the reaction. In comparison, a formic acid assisted reaction as in Example 14 resulted in a stearic acid content of 5.61%. Therefore, the successful use of hydrogen as a promoter with no detrimental reduction of the carbon-carbon double bonds was surprising. The conjugated product achieved with the reaction of this Example was improved due to running under reductive conditions, which minimizes polymerization and the formation of oxidation byproducts.

Example 25

Several reactions were run according to the procedure set forth in Example 13 using ruthenium trichloride hydrate catalyst predissolved in absolute ethanol and stored for a period. It was observed that activity seemed to drop after storage. Thus, two reactions were run—one with fresh catalyst solubilized in absolute ethanol just before the reaction and one with catalyst/ethanol that had been prepared three days before and stored at room temperature. In both cases, 20 ppm ruthenium as ruthenium trichloride hydrate was used in reactions at 180° C. with 250 g superb linseed oil. The conjugation achieved with the predissolved catalyst was 62.8% versus 75.8% conjugation for the reaction run with fresh catalyst. Therefore, this example demonstrates that it is preferred to conduct the process of the invention using freshly solubilized ruthenium trichloride hydrate catalyst.

Example 26

A reaction was run according to the teaching of U.S. Pat. No. 5,717,301 to demonstrate the poor yield obtained when using ethanol in place of formic acid. The ruthenium trichloride hydrate was added exactly as described in Example 13 of the '301 patent and absolute ethanol was substituted for formic acid as described in that Example. 20 ppm ruthenium as ruthenium trichloride hydrate was dissolved in water to give an approximate 13% aqueous solution. This solution was added to 250 g of superb linseed oil at room temperature and about 2 mL of ethanol was used to help wash the last traces of the catalyst into the oil. The water solution first added sank to the bottom of the reaction vessel and the subsequent ethanol wash solubilized upon addition. Absolute ethanol was then substituted for formic acid during the rest of the reaction. Thus, the reaction mixture was heated to 180° C. and 1 mL of ethanol was added beginning at 150° C. followed by an additional 6 mL of ethanol added one drop at a time over the reaction period of 3 hours at the reaction temperature of 180° C. It was observed that the water solution of the catalyst that sank to the bottom of the reaction vessel was never solubilized by the ethanol as it most likely was when formic acid was used according to the '301 patent. The conjugation yield after four hours [3 hours as in '301 patent?] was 9.1%. Therefore, this Example demonstrates that the use of a low molecular weight alcohol in place of formic acid according to the process of the '301 patent does not work to give acceptable conjugation yield.

Example 27

This Example demonstrates the use of solvents other than those having an active hydrogen, e.g. other than acids or alcohols. About 2 mL of methyl ethyl ketone (Ace Hardware Co. 1007608) was used to solubilize 20 ppm ruthenium as ruthenium trichloride hydrate. The catalyst solubilized nicely at room temperature. This solution also solubilized nicely in 250 g of superb linseed oil at room temperature. The reaction mixture was heated to 180° C. and allowed to react for 4 hours. The conjugation yield achieved was 67.5% which was nearly equivalent to the conjugation yield obtained using absolute ethanol.

Example 28

Several other solvents were tested for their ability to solubilize ruthenium trichloride hydrate. In each case, about 1 to 2 mL of solvent was used to dissolve 20 ppm ruthenium as ruthenium trichloride hydrate. The catalyst solution was then added to superb linseed oil to test for solubility of the catalyst solution in the oil.

Ethyl lactate, B.P. 154° C. (Vertec BioSolvents, Inc., Downers Grove, Ill.) solubilized the catalyst nicely at room temperature and that solution subsequently solubilized nicely into about 150 g of superb linseed oil at room temperature.

Acetone, B.P. 56° C. (Ace Hardware Co. 12271) solubilized the catalyst nicely at room temperature and that solution subsequently solubilized nicely into about 150 g of superb linseed oil at room temperature.

1-Octanol, B.P. 196° C. (Aldrich Chemical Co. anhydrous, 29,288-7) solubilized the catalyst nicely at room temperature and that solution subsequently solubilized nicely into about 150 g of superb linseed oil at room temperature.

1-Butanol, B.P. 118° C. (Aldrich Chemical Co. anhydrous, 28,154-9) solubilized the catalyst nicely at room temperature and that solution subsequently solubilized nicely into about 150 g of superb linseed oil at room temperature.

1,4-butanediol, B.P. 230° C. (Aldrich Chemical Co., 49,373-2) was very viscous but solubilized most of the catalyst at room temperature. However, this solution did not solubilize in the linseed oil at or below the reaction temperature of 175–185° C., and thus was not found to be satisfactory for use by itself as a solvent. However, when used in combination with a small amount of absolute ethanol, a solution of the catalyst into the superb linseed oil was obtained.

Example 29

A series of tests were run to determine effectiveness of various solvents to solubilize ruthenium trichloride hydrate and then, if soluble in the solvent, to determine the solubility of the resultant solution in superb linseed oil. This testing was simplified somewhat to make it easier to test a large number of potential solvents. For these tests, 100 grams of superb linseed oil was placed in a round bottom flask fitted with a stirring bar. Approximately 12 mg of ruthenium trichloride hydrate was placed in a 50 mL breaker and about 1–2 mL of solvent to be tested was added at room temperature. If not readily soluble, the temperature of the solvent was raised to about 40° C.

Ketones

| Test Number | Solvent | BP, ° C. | Source | Solubility in Solvent | Solubility in Oil |
|---|---|---|---|---|---|
| 1) | 3-methyl-2-butanone | 93 | Aldrich | Soluble ~1 mL RT** | Soluble RT |
| 2) | 4-methyl-2-pentanone | 117–118 | Aldrich | Soluble ~1 mL RT | Soluble RT |
| 3) | 2,4-dimethyl-3-pentanone | 123.7 | MCB* | Sl. Sol. ~2 mL RT | Soluble RT |
| 4) | 2-pentanone | 101.7 | Aldrich | Soluble ~1 mL RT | Soluble RT |
| 5) | 2-methylcyclohexanone | 165 | Aldrich | Soluble ~1 mL RT | Soluble RT |
| 6) | 2-octanone | 173.5 | MCB | Soluble ~1 mL RT | Soluble RT |

*MCB is Matheson Colman Bell Co.
**(RT is Room Temperature)

Most ketones tested were excellent solvents for $RuCl_3.H_2O$ and excellent in dissolving in oil. 2,4-dimethyl-3-pentanone was the only one which was poor and this was likely due to steric hindrance of the methyl groups. As carbon chain length increases solvent effectiveness likely drops off.

KetoEsters

| Test Number | Solvent | BP, ° C. | Source | Solubility in Solvent | Solubility in Oil |
|---|---|---|---|---|---|
| 7) | Methyl acetoacetate | 170 | Aldrich | Soluble ~1 mL RT | Soluble RT |
| 8) | Ethyl Levulinate | 205.2 | Aldrich | Soluble ~1–2 mL RT | Soluble RT |

Alcohols

| Test Number | Solvent | BP, ° C. | Source | Solubility in Solvent | Solubility in Oil |
|---|---|---|---|---|---|
| 9) | Hexanol | 157.2 | Eastman Chem. | Soluble ~1 mL RT | Soluble RT |
| 10) | Heptanol | 176 | Fisher | Soluble ~1 mL RT | Soluble RT |
| 11) | decyl alcohol | 231 | MCB | Soluble ~1 mL RT | Soluble RT |
| 12) | 2-methyl-1-butanol | 128 | Aldrich | Soluble ~1 mL RT | Soluble RT |
| 13) | Cyclohexanol | 161.5 | Fisher | Soluble ~1 mL RT | Soluble RT |
| 14) | oleyl alcohol | 205 @15 psi | NuCheck Prep+ | Soluble ~1–2 mL RT | Soluble RT |

+NuCheck Prep, P.O. Box 295, Elysian, MN 56028

Diols/Polyols

| Test Number | Solvent | BP, ° C. | Source | Solubility in Solvent | Solubility in Oil |
|---|---|---|---|---|---|
| 15) | 1,2-butanediol | 192 | Aldrich | Soluble ~1 mL RT | Soluble RT cloudy |
| 16) | 1,5-pentadediol | 239.4 | Aldrich | Soluble ~1 mL RT | Insoluble RT, Sl. Sol 100° C. |
| 17) | ethylene glycol | 197.2 | Fisher | Soluble ~1 mL RT | Insoluble RT and 100° C. Catalyst turned black 130° C. |
| 18) | Glycerol | | Fisher | Soluble ~1 mL RT | Insoluble RT and 100° C. |

Most diols are too polar to dissolve in linseed oil, and thus are not good solvents for this catalyst in vegetable oils; however they would be excellent solvents for those substrates in which diols are soluble.

Esters

| Test Number | Solvent | BP, ° C. | Source | Solubility in Solvent | Solubility in Oil |
|---|---|---|---|---|---|
| 19) | methyl salicylate | 223.3 | Eastman Chem. | Soluble ~1 mL RT | Soluble RT |
| 20) | methyl valerate | 127.3 | Aldrich | Soluble ~1–2 mL RT | Soluble RT |
| 21) | ethyl acetate | 77.15 | Fisher | Soluble ~1 mL RT | Soluble RT |
| 22) | ethyl butyrate | 166.4 | Aldrich | Sl. Soluble ~2 mL RT (about ¼ dissolved) | Soluble RT |
| 23) | ethyl benzoate | 212.6 | Aldrich | Sl. Soluble ~2 mL RT (about ⅓ dissolved,) | Soluble RT |
| 24) | diethyl malonate | 198.9 | MCB | Soluble ~1–2 mL RT | Soluble RT |
| 25) | diethyl phthalate | 282 | MCB | Sl. Soluble ~2 mL RT (about ½ dissolved) | Soluble RT |
| 26) | butyl acetate | 126.5 | MCB | Soluble ~2 mL RT | Soluble RT |
| 27) | butyl butyrate | 166.4 | Aldrich | Sl. Soluble ~2 mL RT (about ½ dissolved) | Soluble RT |
| 28) | butyl benzoate | 250.3 | Aldrich | Only Very Sl. Soluble ~2 mL RT | Soluble RT |
| 29) | phenyl acetate | 196 | Aldrich | Sl Soluble ~2 mL RT (about ½ dissolved) | Soluble RT |
| 30) | linseed oil methyl esters | 216 @20 PSI | Syn++ | Sl. Soluble ~2 mL at 40° C. | Soluble RT |

++Methyl Esterified linseed oil in lab.

The esters loose effectiveness as the carbon chain length increase.

Acids

| Test Number | Solvent | BP, °C | Source | Solubility in Solvent | Solubility in Oil |
|---|---|---|---|---|---|
| 31) | isovaleric acid | 176.7 | Aldrich | Insoluble RT | Very sl. Soluble RT |
| 32) | hexanoic acid | 205 | MCB | Only very very sl. soluble ~2 mL at 50° C. | ~2 ml Soluble RT Soluble but may have a limit |
| 33) | soybean oil fatty acids | — | A. C. Humko | Insoluble <40° C. | — |

Ethers

| Test Number | Solvent | BP, °C | Source | Solubility in Solvent | Solubility in Oil |
|---|---|---|---|---|---|
| 34) | diethyl ether | 55–56 | Fisher | Only very sl. soluble ~2 mL RT | Soluble RT but cloudy |
| 35) | methyl tert-butyl ether | 55–56 | Aldrich | Only very sl. soluble ~2 mL RT | Soluble RT |
| 36) | Tetrahydrofuran | 64–66 | Fisher | Sl. Soluble ~2 mL RT (more soluble than number 34) | Soluble RT |

Emulsifiers, etc.

| Test Number | Solvent | BP, °C | Source | Solubility in Solvent | Solubility in Oil |
|---|---|---|---|---|---|
| 37) | PEG 400 (polyethylene glycol) (400 mol wt.) | Liquid at RT | Fischer | Sl. Soluble ~1–2 mL RT (not all dissolved) | Soluble RT |
| 38) | Grindsted ® Lactem P22, Lactic acid ester of mono-diglycerides made from fully hyrdogenated palm oil | Solid at RT | Danisco# | Soluble ~2 mL melted Lactem P22 at < ‾60° C. | Soluble < ~60° C. |
| 39) | Grindsted ® Mono-Di HV 52-K-A (Mono-diglycerides made from fully hyrdogenated vegetable oil) | Solid at RT | Danisco | Soluble ~2 mL melted HV 52-K-A at < ‾60° C. | Soluble < ~60° C. |
| 40) | Sorbitan monooleate Glycomul ® O | Liquid at RT | Lonza## | Sl. Soluble ~2 mL at 40° C. | Soluble |

Danisco USA Inc., 201 New Century Parkway, New Century, KS 66301
Lonza Inc., 17-17 Route 208, Fairlawn, NJ 07413

Of test numbers 37–40, test number 38 was best and slightly better than DMG 130 in Example 21. These solvents are somewhat slow to dissolve the ruthenium trichloride hydrate and may be helped by the addition of a small amount of absolute ethanol, methyl ethyl ketone or other good solvent to solubilize and then allow the low boiling solvent to evaporate.

Aldehydes

The least preferred solvent as a class is the aldehydes due to toxicity, volatility, reactivity and safety considerations (especially inhalation). However to show utility, three were tested.

| Test Number | Solvent | BP, °C | Source | Solubility in Solvent | Solubility in Oil |
|---|---|---|---|---|---|
| 41) | Hexanal | 131 | Aldrich | Soluble 1–2 mL RT | Soluble RT |
| 42) | octyl aldehyde | 171 | Aldrich | Sl. Soluble insoluble portion was gummy | Soluble RT |
| 43) | decyl aldehyde | 207–209 | Aldrich | Only very Sl. Soluble RT | Soluble RT |

Chlorinated Hydrocarbons

| Test Number | Solvent | BP, °C | Source | Solubility in Solvent | Solubility in Oil |
|---|---|---|---|---|---|
| 44) | 1,2-dichlorethane | 83 | Aldrich | Insoluble | — |

It should be noted that for all tests ruthenium trichloride hydrate was a hydrate. This hydrate may have had some slight variability batch to batch, which may have affected the above solubility data.

Example 30

A relative comparison of solubilities of ruthenium bromide hydrate was made using the two most effective solvents used for ruthenium chloride hydrate. Ruthenium bromide hydrate was only very very slightly soluble in hot absolute ethanol, and only very very slightly soluble in hot methyl ethyl ketone (both solvents at their boiling points). Ruthenium iodide only forms the anhydrous compound and is insoluble in most solvents. The iodide catalyst is roughly five times the cost of the chloride catalyst. The bromide catalyst is 2–3 times more expensive that the chloride catalyst and due to its limited solubility would not be very effective as a conjugation catalyst.

What is claimed is:

1. A process for conjugating organic compounds containing methylene interrupted carbon-carbon double bonds comprising:

(a) contacting ruthenium trichloride hydrate and a suitable organic solvent to form a first mixture, said organic solvent being present in an amount sufficient to solubilize said ruthenium trichloride hydrate; and (b) contacting said first mixture with an organic compound containing methylene interrupted carbon-carbon double bonds at a sufficient temperature and for a sufficient time to conjugate said organic compound containing methylene interrupted carbon-carbon double bonds;

wherein said first mixture is substantially soluble in said organic compound containing methylene interrupted carbon-carbon double bonds, and the ruthenium in said ruthenium trichloride hydrate in (b) is present in an amount of about 5 ppm to about 100 ppm based on the weight of said organic compound containing methylene interrupted carbon-carbon double bonds.

2. The process of claim 1 wherein said organic compound containing methylene interrupted carbon-carbon double bonds is a triglyceride oil having an iodine value of at least 120.

3. The process of claim 2 wherein said triglyceride oil is selected from linseed oil, fish oil, soybean oil, sunflower oil, safflower oil, rapeseed oil, corn oil, tall oil, genetically modified vegetable oils, or mixtures thereof.

4. The process of claim 3 wherein said triglyceride oil is selected from linseed oil, soybean oil or mixtures thereof.

5. The process of claim 1 wherein said organic compound containing methylene interrupted carbon-carbon double bonds is a mono- or diglyceride or polyol fatty acid ester of a vegetable or fish oil, or an ester of a vegetable or fish oil.

6. The process of claim 1 wherein the ruthenium in said ruthenium trichloride hydrate in (b) is present in an amount of about 10 ppm to about 50 ppm based on the weight of said organic compound containing methylene interrupted carbon-carbon double bonds.

7. The process of claim 6 wherein the ruthenium in said ruthenium trichloride hydrate in (b) is present in an amount of about 15 ppm to about 40 ppm based on the weight of said organic compound containing methylene interrupted carbon-carbon double bonds.

8. The process of claim 1 wherein step (b) is conducted in the presence of oxygen.

9. The process of claim 1 wherein said organic solvent is substantially free of water.

10. The process of claim 9 wherein said organic solvent has no more than about 1 wt. % water.

11. The process of claim 1 wherein said organic solvent is selected from monoalcohols having 1 to about 18 carbon atoms, diols having 2 to 5 carbon atoms, polyols having 3 to about 6 carbon atoms, monoglycerides represented by the formula $RCOOCH_2CHOHCH_2OH$, mono-diglycerides, fatty acid ester-based emulsifier, ketones having 3 to about 8 carbon atoms, alkyl lactates represented by the formula $CH_3CHOHCOOR_1$, ethylene glycol monoalkyl ethers represented by the formula $H(O-CH_2CH_2)_x-OR_2$, esters having 4 to about 8 carbon atoms, ketoesters having 6 to about 10 carbon atoms, aldehydes having 2 to about 6 carbon atoms, or mixtures thereof;

wherein R is an alkyl, or alkenyl group having up to about 24 carbon atoms, $R_1$ is an alkyl group having 1 to about 4 carbon atoms, x is 1 to about 10, and $R_2$ is an alkyl group having 1 to about 4 carbon atoms.

12. The process of claim 11 wherein said organic solvent is a monoalcohol selected from methanol, ethanol, or isopropanol.

13. The process of claim 12 wherein said monoalcohol is ethanol.

14. The process of claim 13 wherein said ethanol is absolute ethanol.

15. The process of claim 11 wherein said organic solvent is a diol.

16. The process of claim 15 wherein said diol is 1,2-propylene glycol.

17. The process of claim 11 wherein said organic solvent is a monoglyceride, mono-diglyceride or fatty acid ester-based emulsifier.

18. The process of claim 11 wherein said organic solvent is a ketone.

19. The process of claim 11 wherein said organic solvent is an alkyl lactate.

20. The process of claim 11 wherein said organic solvent is an ethylene glycol monoalkyl ether.

21. The process of claim 20 wherein x is 1.

22. The process of claim 11 wherein said organic solvent is a polyol.

23. The process of claim 11 wherein said organic solvent is an ester.

24. The process of claim 11 wherein said organic solvent is a ketoester.

25. The process of claim 11 wherein said organic solvent is an aldehyde.

26. The process of claim 1 wherein said process is a continuous process.

27. The process of claim 1 wherein said process is a batch process.

28. The process of claim 27 wherein the time of the conjugation of step (b) is about 1 to about 4 hours.

29. The process of claim 27 wherein said first mixture is contacted with a portion of said organic compound containing methylene interrupted carbon-carbon double bonds at a temperature below the reaction temperature to form a second mixture, and said second mixture is then contacted with the remaining portion of said organic compound containing methylene interrupted carbon-carbon double bonds which is pre-heated to the reaction temperature.

30. The process of claim 1 wherein the conjugation in step (b) is conducted in the presence of hydrogen.

31. The process of claim 1 wherein the temperature of the conjugation of step (b) is about 160° C. to about 200° C.

32. The process of claim 1 wherein at least about 50 percent of the methylene interrupted carbon-carbon doubled bonds in said organic compound are conjugated in step (b).

33. The process of claim 32 wherein at least about 70 percent of the methylene interrupted carbon-carbon doubled bonds in said organic compound are conjugated in step (b).

34. A process for conjugating organic compounds containing methylene interrupted carbon-carbon double bonds comprising:

(a) contacting ruthenium trichloride hydrate and an organic solvent selected from monoalcohols having 1 to about 18 carbon atoms, diols having 2 to 5 carbon atoms, polyols having 3 to about 6 carbon atoms, monoglycerides represented by the formula $RCOOCH_2CHOHCH_2OH$, mono-diglycerides, fatty acid ester-based emulsifier, ketones having 3 to about 8 carbon atoms, alkyl lactates represented by the formula $CH_3CHOHCOOR_1$, ethylene glycol monoalkyl ethers represented by the formula $H(O-CH_2CH_2)_x-OR_2$, esters having 4 to about 8 carbon atoms, ketoesters having 6 to about 10 carbon atoms, aldehydes having 2 to about 6 carbon atoms, or mixtures thereof to form a first mixture, said organic solvent being present in an amount sufficient to solubilize said ruthenium trichloride hydrate; and (b) contacting said first mixture with an organic compound containing methylene interrupted carbon-carbon double bonds at a sufficient temperature and for a sufficient time to conjugate said organic compound containing methylene interrupted carbon-carbon double bonds;

wherein R is an alkyl, or alkenyl group having up to about 24 carbon atoms, $R_1$ is an alkyl group having 1 to about 4 carbon atoms, x is 1 to about 10, and $R_2$ is an alkyl group having 1 to about 4 carbon atoms; said first mixture is substantially soluble in said organic compound containing methylene interrupted carbon-carbon double bonds; and the ruthenium in said ruthenium trichloride hydrate in (b) is present in an amount of about 10 ppm to about 50 ppm based on the weight of said organic compound containing methylene interrupted carbon-carbon double bonds.

35. The process of claim 34 wherein at least about 30 percent of the methylene interrupted carbon-carbon doubled bonds in said organic compound are conjugated in step (b).

36. The process of claim 34 wherein said organic solvent is substantially free of water.

37. The process of claim 36 wherein the temperature of the conjugation of step (b) is about 160° C. to about 200° C.

38. The process of claim 37 wherein said organic solvent is selected from ethanol, 1,2-propylene glycol, a monoglyceride, a mono-diglyceride, or a fatty acid ester-based emulsifier.

39. A process for conjugating organic compounds containing methylene interrupted carbon-carbon double bonds comprising:
(a) contacting ruthenium trichloride hydrate and at least one carboxylic acid having at least 2 carbon atoms to form a first mixture, said carboxylic acid being present in an amount sufficient to solubilize said ruthenium trichloride hydrate; and
(b) contacting said first mixture with an organic compound containing methylene interrupted carbon-carbon double bonds at a sufficient temperature and for a sufficient time to conjugate said organic compound containing methylene interrupted carbon-carbon double bonds;

wherein said first mixture is substantially soluble in said organic compound containing methylene interrupted carbon-carbon double bonds, and the ruthenium in said ruthenium trichloride hydrate in (b) is present in an amount of about 5 ppm to about 100 ppm based on the weight of said organic compound containing methylene interrupted carbon-carbon double bonds.

40. The process of claim 39 wherein said organic compound containing methylene interrupted carbon-carbon double bonds is a triglyceride oil having an iodine value of at least 120.

41. The process of claim 40 wherein said triglyceride oil is selected from linseed oil, fish oil, soybean oil, sunflower oil, safflower oil, rapeseed oil, corn oil, tall oil, genetically modified vegetable oils, or mixtures thereof.

42. The process of claim 41 wherein said triglyceride oil is selected from linseed oil, soybean oil or mixtures thereof.

43. The process of claim 39 wherein said organic compound containing methylene interrupted carbon-carbon double bonds is a mono- or diglyceride or polyol fatty acid ester of a vegetable or fish oil, or an ester of a vegetable or fish oil.

44. The process of claim 39 wherein the ruthenium in said ruthenium trichloride hydrate in (b) is present in an amount of about 10 ppm to about 50 ppm based on the weight of said organic compound containing methylene interrupted carbon-carbon double bonds.

45. The process of claim 44 wherein the ruthenium in said ruthenium trichloride hydrate in (b) is present in an amount of about 15 ppm to about 40 ppm based on the weight of said organic compound containing methylene interrupted carbon-carbon double bonds.

46. The process of claim 39 wherein step (b) is conducted in the presence of oxygen.

47. The process of claim 39 wherein said carboxylic acid is substantially free of water.

48. The process of claim 47 wherein said carboxylic acid has no more than about 1 wt. % water.

49. The process of claim 39 wherein said carboxylic acid contains 2 to about 6 carbon atoms.

50. The process of claim 49 wherein said carboxylic acid is selected from acetic acid, propionic acid, or mixtures thereof.

51. The process of claim 50 wherein said carboxylic acid is acetic acid.

52. The process of claim 39 wherein said process is a continuous process.

53. The process of claim 39 wherein said process is a batch process.

54. The process of claim 53 wherein the time of the conjugation of step (b) is about 1 to about 4 hours.

55. The process of claim 53 wherein said first mixture is contacted with a portion of said organic compound containing methylene interrupted carbon-carbon double bonds at a temperature below the reaction temperature to form a second mixture, and said second mixture is then contacted with the remaining portion of said organic compound containing methylene interrupted carbon-carbon double bonds which is pre-heated to the reaction temperature.

56. The process of claim 39 wherein the conjugation in step (b) is conducted in the presence of hydrogen.

57. The process of claim 39 wherein the temperature of the conjugation of step (b) is about 160° C. to about 200° C.

58. The process of claim 39 wherein at least about 50 percent of the methylene interrupted carbon-carbon doubled bonds in said organic compound are conjugated in step (b).

59. The process of claim 58 wherein at least about 70 percent of the methylene interrupted carbon-carbon doubled bonds in said organic compound are conjugated in step (b).

60. A conjugated organic compound prepared by conjugating an organic compound containing methylene interrupted carbon-carbon double bonds according to the process of claim 1.

61. A conjugated organic compound prepared by conjugating an organic compound containing methylene interrupted carbon-carbon double bonds according to the process of claim 39.

* * * * *